United States Patent Office 3,463,100
Patented Aug. 26, 1969

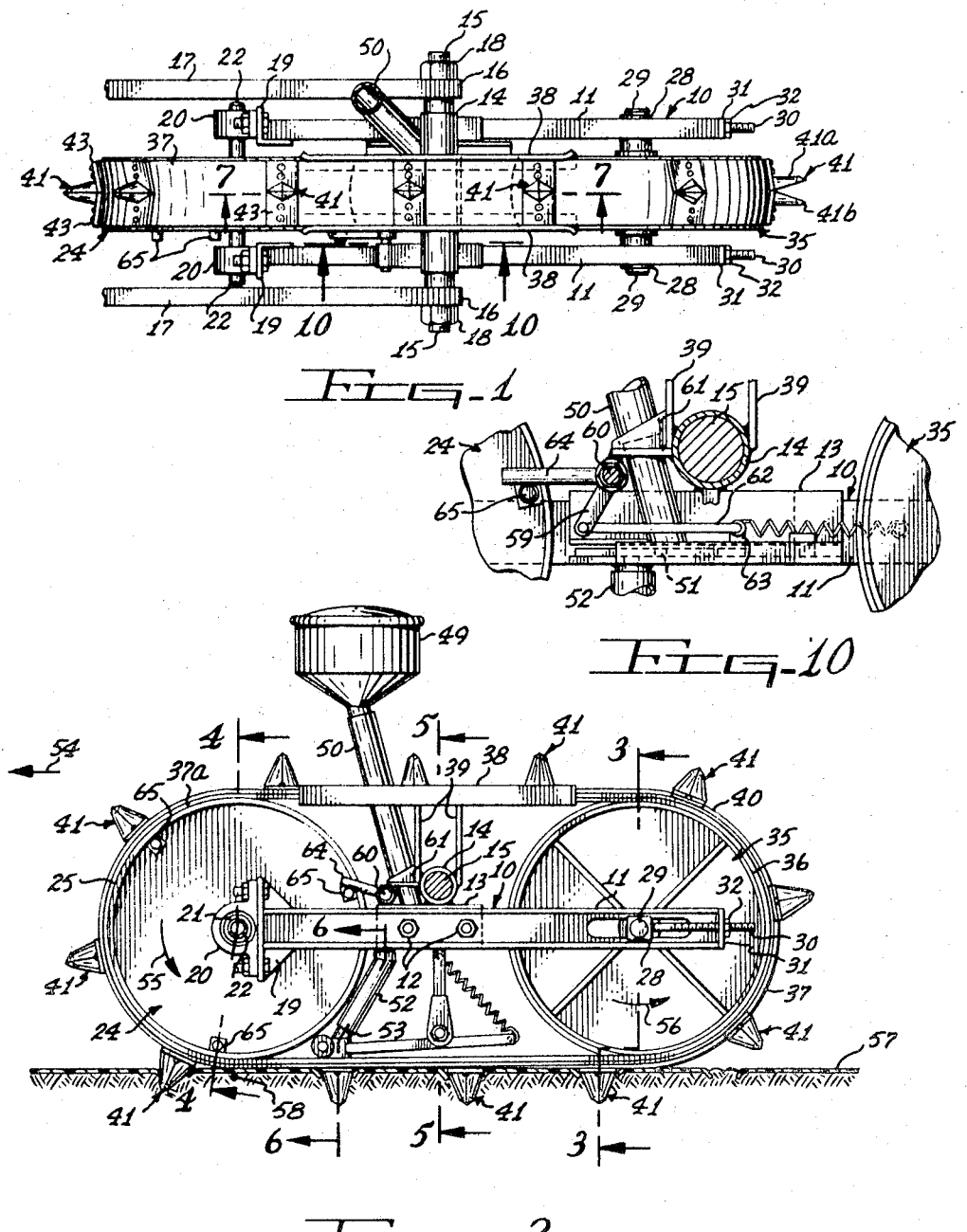

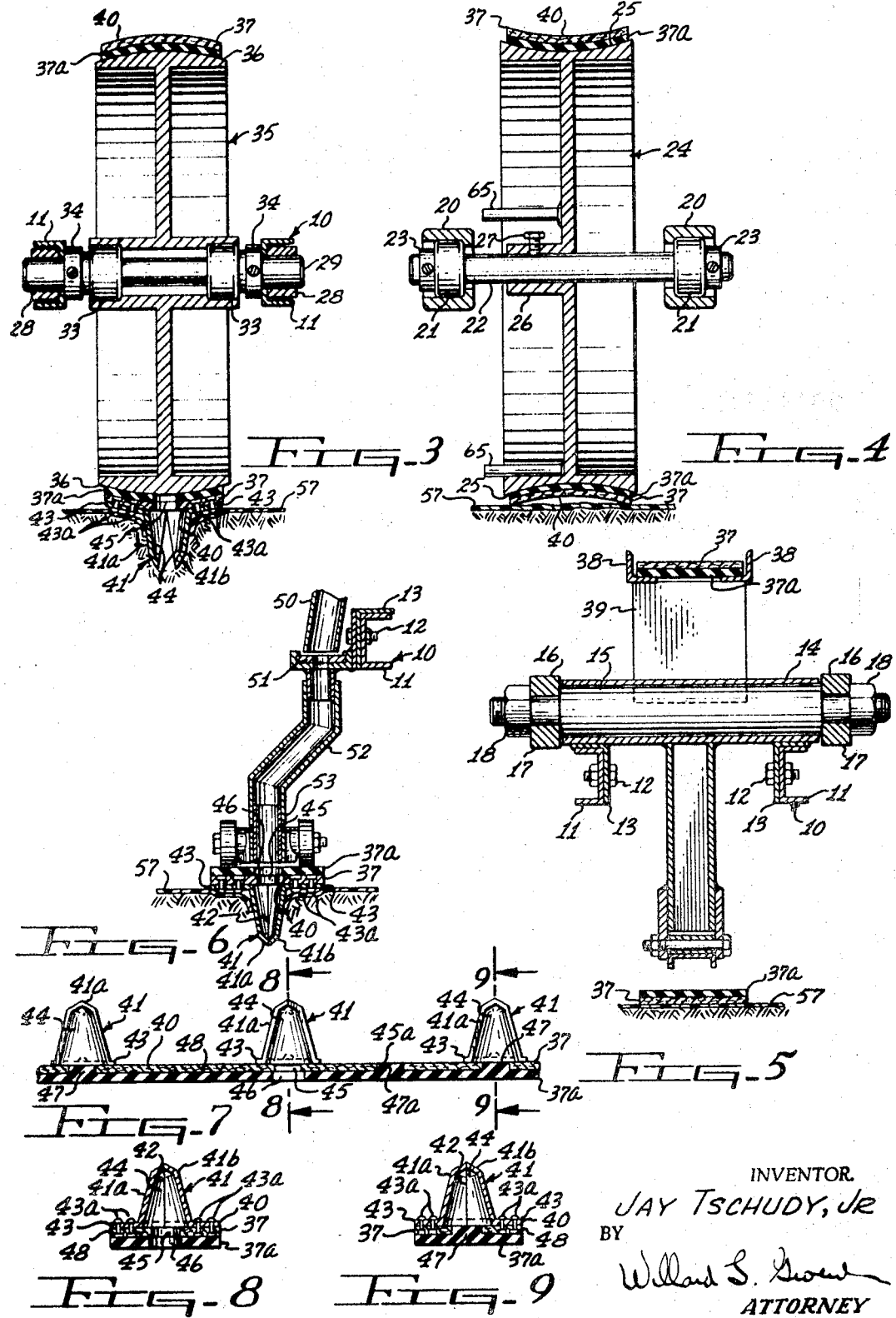

3,463,100
PRECISION SEED PLANTER APPARATUS
Jay Tschudy, Jr., Shawnee Mission, Kans., assignor to Precision Agricultural Machinery Company, Phoenix, Ariz., a corporation of Arizona
Filed Apr. 12, 1967, Ser. No. 630,265
Int. Cl. A01c 7/18, 5/06
U.S. Cl. 111—91
1 Claim

ABSTRACT OF THE DISCLOSURE

A precision seed planting apparatus for accurately planting seed in a prepared plant row of a field utilizing an endless ground contacting belt and an inside liner belt to change the spacing of the seel planting along the plant row.

Cross-references to related applications

This application is related to improvements in precision seed planting apparatus as shown in Patent 3,175,523, issued Mar. 30, 1965.

Background of the invention (1) The field of this invention lies in agricultural machinery, and is particularly directed to precision endless belt precision seed planting apparatus.

(2) Heretofore, it has been necessary to completely replace the endless belt with planting dibbles of different longitudinal spacing whenever it was necessary to change the plant spacing along the plant row. This has resulted in maintaining a stock of expensive endless planting belts of various dibble spacing.

Further, it was a problem to maintain these endless planting belts because of the rapid wear between the inside of the belts and the support pulleys causing rapid deterioration and belt breakage.

Summary of the invention

One of the objects of this invention is to provide a precision seed planter for accurately planting seeds at longitudinally spaced intervals along a plant row of a field in which the spacing of the plantings may be efficiently varied.

Another object of this invention is to provide a precision seed planter capable of injecting a seed below the ground level at accurately spaced intervals along the field plant row through an endless belt having an inner removable liner.

It is a further object to provide a precision planter that is particularly well adapted to plant seed through a plastic sheet stretched over the soil of the plant row at accurately spaced and readily changed intervals along the plant row.

Still another object of this invention is to provide a precision planter capable of perforating and planting seed through a plastic sheet covered plant row or a bare plant row in such manner that the planted seed in the ground are in exact register with the perforations in the plastic sheet with no stranded seed present under unperforated portions of the plastic sheet and in which the spacing may be changed without changing the outer dibble carrying belt.

It is also an object to accomplish the above recited objectives with a precision seed planter operable over the crop row in a continuous automatic manner by merely changing an inner liner supporting the outer dibble belt on the support pulleys of the planter.

Another object is to provide a seed planter with an endless belt having a series of longitudinally split perforating and planting fingers projecting from the periphery thereof wherein the dibble belt is carried on a liner belt in turn carried on a pair of pulleys, one having a convex periphery and the other a concave periphery such that the operation of the dibble and liner belts remain in register over the pulleys to effect the lateral opening and closing of said split dibble fingers.

Brief description of the drawings

FIG. 1 is a top plan view of a precision seed planter incorporating the features of this invention.

FIG. 2 is a left hand side elevation of the apparatus shown in FIG. 1.

FIG. 3 is an enlarged fragmentary sectional view on the line 3—3 of FIG. 2.

FIG. 4 is an enlarged fragmentary sectional view on the line 4—4 of FIG. 2.

FIG. 5 is an enlarged sectional view on the line 5—5 of FIG. 2.

FIG. 6 is an enlarged fragmentary sectional view on the line 6—6 of FIG. 2.

FIG. 7 is an enlarged fragmentary sectional view on the line 7—7 of FIG. 1.

FIG. 8 is an enlarged fragmentary sectional view on the line 8—8 of FIG. 7.

FIG. 9 is an enlarged fragmentary sectional view on the line 9—9 of FIG. 7.

FIG. 10 is an enlarged fragmentary sectional view on the line 10—10 of FIG. 1.

Description of the preferred embodiment

As an example of one embodiment of this invention there is shown a precision seed planter comprising a frame 10 consisting of a pair of side rail channel members 11 which are fixed by suitable bolts 12 to the brackets 13 which are rigidly welded to the tubular support member 14. The tubular support member 14 is rotatably mounted on the rockshaft 15 carried in the outer ends 16 of the usual lifting and positioning levers 17 of a tractor, not shown. Suitable nuts 18 threaded on the ends of the rockshaft 15 demountably secure the described frame structure on the tractor arms 17.

On the front ends of the side rails 11 are fixed flanges 19 to which are secured the pillow blocks 20 containing anti-friction bearings 21 which support the concave pulley shaft 22 held against axial movement in the bearings 21 by suitable lock collars 23 on the ends of the shaft 22. A concave pulley 24 having the concave peripheral surface 25 has the integral hub 26 which is securely locked to the shaft 22 by a suitable set screw 27.

On the rearward portions of the side rails 11 are longitudinally slidably mounted the adjusting blocks 28 in which is fixed the convex pulley shaft 29. Suitable adjusting screws 30 are fixed to and extend rearwardly from the adjusting blocks 28 and pas through abutment plates 31 fixed to rear ends of the side rails 11. Appropriate jamb nuts 32 threaded on the adjusting screws 30 abut against the plates 31 to pull the convex pulley shaft 29 rearwardly of the side rails 11 to desired positions. Anti-friction bearings 33 are held against axial movement on the shaft 29 by suitable lock collars 34 and rotatably support the convex pulley 35 having the convex peripheral surface 36. A flat flexible inner liner belt 37a adapted to bend laterally operates over the concave surface 25 and the convex surface 36 of the pulleys 24 and 35 over which operates the outer dibble carrying belt 37, and by appropriately adjusting the nuts 32 proper tension is maintained in the belts 37 and 37a so that the belts conform to the peripheries of the pulleys 24 and 35. The upper run of the belts is preferably supported by suitable guide tracks 38 rigidly supported on the top edges of support plates 39 fixed to the tubular support member 14 for smooth operation and proper lateral positioning and tracking of the belts on the pulleys 24 and 35.

Projecting outwardly from the outer peripheral surface 40 of the dibble belt 37 are the split planter fingers or dibbles 41 each of which comprises a pair of laterally disposed segments 41a and 41b having a parting line 42 lying in a longitudinally disposed plane intermediate the sides of the belt and parallel to the direction of belt travel. Each segment 41a and 41b has a mounting flange 43 extending laterally away from the parting line 42 outwardly from the root of the planter finger segment which is securely riveted at 43a or otherwise secured to the outer peripheral surface 40 of the belt 37 so that lateral bending or flexing of the belt opens and closes the finger segments. Each of the segments 41a and 41b are hollowed out at 44 so as to form a seed compartment which communicates with an opening or seed passageway 45 formed in the belt 37.

The liner belt 37a is provided with a series of seed passageways 46, and locating and closure plugs 47 fixed to the outer surface 48 of the liner belt, the passageways 46 and plugs 47 being in longitudinal spaced alignment with the seed passageways 45 in the dibble carrying belt 37. A seed hopper 49 carried on the seed supply pipe 50 appropriately fixed to the frame 10 discharges at its lower end through a suitable seed gate 51 into a flexible seed discharge pipe 52. The lower discharge end 53 of the seed discharge pipe 52 is supported in alignment with the seed passageways 45 and 46 in the belts 37 and 37a so that these passageways successively pass under the discharge end 53 as the belts operate together over the pulleys 24 and 25.

The above described precision seed planter is placed on the ground surface of the plant row bed to be seeded, as best shown in FIG. 2. The unit is then moved along in the direction indicated by the arrow 54 by a suitable tractor so that the pulleys 24 and 35 rotate in the direction indicated by the arrows 55 and 56 with the lower portion of the belt 37 in stationary contact with the ground 57 and the upper run belts traveling in the direction of the arrow 54. As the belts 37 and 37a approach and travel over the concave peripheral surface 25 of the pulley 24 the parting line 42 is held tightly closed in a planting finger 41 as it is rolled into the ground surface 57 at the point 58. As the unit travels the discharge end 53 of the seed discharge pipe 52 arrives over the seed passageway 46 in the belt 37a to drop seed in the hollowed out portion 44 of the seed finger 41. The belts 37 and 37a are held in proper registry when all dibbles 41 are in use by supplementary registry holes 45a formed in the belt 37 between pairs of seed passageways 45 with supplementary plugs 47a engaging in holes 45a.

The seed gate 51 is actuated in timed relationship with the passage of the seed passageways 45 and 46 in the liner belt 37a and dibble carrying belt 37 under the discharge end 53 of the discharge pipe 52 by a lever arm 59 fixed on a rockshaft 60 pivotally mounted on a bracket 61 fixed to the tubular support member 14 and having its outer end pivotally connected to a link 62 in turn pivotally connected to a boss 63 fixed to the seed gate 51. A trip lever 64 fixed on the rockshaft 60 is adapted to be engaged by a series of circumferentially spaced trip pins 65 fixed adjacent the rim of the pulley 24.

As the convex pulley 35 approaches and arrives over the injected seed finger 41 the finger opens laterally allowing the seed to drop from the finger into the cavity in the ground by the finger. As the belt 37 moves upwardly over the pulley 35 the opened finger 41 is withdrawn from the ground cavity in such a way as to leave therein the cavity and to cause soil from the side walls of the cavity to cave in and cover the seeds in the bottom of the cavity for proper growth. The belts and fingers then return along the upper run to the pulley 24 to repeat the described cycle of operation. Because of the positive spacing of the fingers 41 along the belt a high precision of plant spacing results in the field seeded with this device.

It is to be noted that when the belt 37 is operated without the liner belt as in the referred to Patent 3,175,523 every seed pasageway 45 and planter finger 41 is operative to receive and plant seed in the plant row, the belt 37 having its inside surface running directly on the perimeters of the pulleys 24 and 35. When a liner belt has every other seed pasageway 46 open with closure plugs 47 thereof inserted in every other seed passageway 45 in belt 37, the seed plantings will then be twice as far apart since every other dibble will then be de-activated. By providing a liner belt 37a with two adjacent closure plugs 47 between each pair of seed pasageways 46 the spacing can be tripled. Other selection of passageways 46 and plugs 47 may be utilized to thus quickly and easily change plant spacing without in any way altering or changing the main dibble planter belt 37. And it will be further noted that the liner belt takes up the operative wear directly against the pulley diameters to thereby greatly increase the operative life of the main planter belt.

While the apparatus herein disclosed and described constitutes a preferred form of the invention, it is also to be understood that the apparatus is capable of mechanical alteration without departing from the spirit of the invention.

I claim:
1. A precision seed planter comprising in combination:
(A) a frame,
(B) a concave pulley journaled on said frame,
(C) a convex pulley journaled on said frame,
(D) a laterally flexible liner belt operating over and in frictional contact with the periphery of said pulleys,
(E) a laterally flexible planter belt operating over and in separable contact with said liner belt and in contact with the ground surface so as to support said frame through said pulleys,
(F) a series of longitudinally spaced planter fingers, mounted on the outer peripheral ground contacting surface of said planter belt, pressed in and removed from the ground by the rolling of said pulleys within said belts while said planter belt is supported on the ground surface,
(G) aligned seed pasageways through said planter belt in communication with said planter fingers,
(H) passageways in said under belt aligned with selected seed pasageways in said planter belt,
(I) and locating, driving and closure plugs projecting radially outwardly from the outer surface of said liner belt engaging in the remainder of said seed passageways in said planter belt so as to control the number of effective planter fingers and the spacing of the planted seeds while providing a positive drive connection between both belts.

References Cited

UNITED STATES PATENTS 3,175,523   3/1965   Kappelmann _____ 111—89

ROBERT E. BAGWILL, Primary Examiner

RONALD C. HARRINGTON, Assistant Examiner